US009310890B2

(12) United States Patent
Brewer

(10) Patent No.: US 9,310,890 B2
(45) Date of Patent: Apr. 12, 2016

(54) SHAKE-BASED FUNCTIONS ON A COMPUTING DEVICE

(71) Applicant: Barnes & Noble College Booksellers, LLC, Basking Ridge, NJ (US)

(72) Inventor: Dale J. Brewer, San Marcos, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 118 days.

(21) Appl. No.: 13/897,328

(22) Filed: May 17, 2013

(65) Prior Publication Data

US 2014/0344764 A1 Nov. 20, 2014

(51) Int. Cl.
*G06F 3/01* (2006.01)
*G06F 1/16* (2006.01)

(52) U.S. Cl.
CPC ........ *G06F 3/017* (2013.01); *G06F 2200/1637* (2013.01)

(58) Field of Classification Search
CPC .......... G06F 2200/1637; G06F 1/1626; G06F 3/0346
See application file for complete search history.

(56) References Cited

U.S. PATENT DOCUMENTS

| 5,768,521 A * | 6/1998 | Dedrick | G06Q 10/107 705/32 |
| 6,433,793 B1 * | 8/2002 | Ootsuka | G06F 1/1626 345/684 |
| 2006/0017692 A1 * | 1/2006 | Wehrenberg et al. | 345/156 |
| 2009/0197635 A1 * | 8/2009 | Kim et al. | 455/550.1 |
| 2009/0262074 A1 * | 10/2009 | Nasiri et al. | 345/158 |
| 2010/0070926 A1 * | 3/2010 | Abanami et al. | 715/835 |
| 2010/0117959 A1 * | 5/2010 | Hong | G06F 1/1626 345/158 |
| 2011/0163944 A1 * | 7/2011 | Bilbrey et al. | 345/156 |
| 2012/0036485 A1 * | 2/2012 | Watkins et al. | 715/863 |
| 2012/0050161 A1 * | 3/2012 | Andersson | G06F 1/1626 345/158 |

OTHER PUBLICATIONS

PatrickJ. "ProSwitcher—The Mother of All iPhone App-switching Apps". iSource. Dec. 20, 2009. <http://isource.com/2009/12/20/proswitcher-the-mother-of-all-iphone-app-switching-apps/>.*

* cited by examiner

*Primary Examiner* — Jennifer To
*Assistant Examiner* — Liang Li
(74) *Attorney, Agent, or Firm* — Finch & Maloney PLLC

(57) ABSTRACT

Techniques are disclosed for managing active applications on a mobile computing device, referred to collectively herein as a manage active apps mode. The manage active apps mode may be invoked by shaking the device while pressing the device's power button (or while manipulating one or more other user interface control features). The device may include one or more accelerometers, for example, to detect when (and possibly how) the device is being shaken. When invoked, the manage active apps mode may be configured to perform the function of closing, stopping, force stopping, quitting, or deleting one or more of the device's active applications, for example. In some cases, the mode function performed may be determined by the direction the device is being shaken, such as if the device is being shaken from side-to-side or up-and-down.

6 Claims, 8 Drawing Sheets

SHAKE-BASED FUNCTIONS ON A COMPUTING DEVICE

FIELD OF THE DISCLOSURE

This disclosure relates to computing devices, and more particularly, to techniques for managing active applications on a mobile computing device.

BACKGROUND

Mobile computing devices such as smart phones, eReaders, tablet computers, personal digital assistants (PDAs), and other such devices are commonly used for displaying consumable content and running multiple software applications (also known as applications or apps). The applications may vary based on the device, but may include applications in categories such as, for example, communication, entertainment, children, social, games, news and weather, tools and utilities, and productivity, just to name a few types. The devices are useful for displaying a user interface that allows a user to interact with the displayed content, such as content provided by the various applications. The devices generally include one or more hardware features for receiving user input, such as buttons (e.g., power button, volume buttons, etc.), microphones, and accelerometers. The mobile computing device may also include a touch sensitive surface/interface for receiving user input such as a touch screen or a track pad (e.g., in combination with a non-touch sensitive display).

DETAILED DESCRIPTION

Figure 1A:
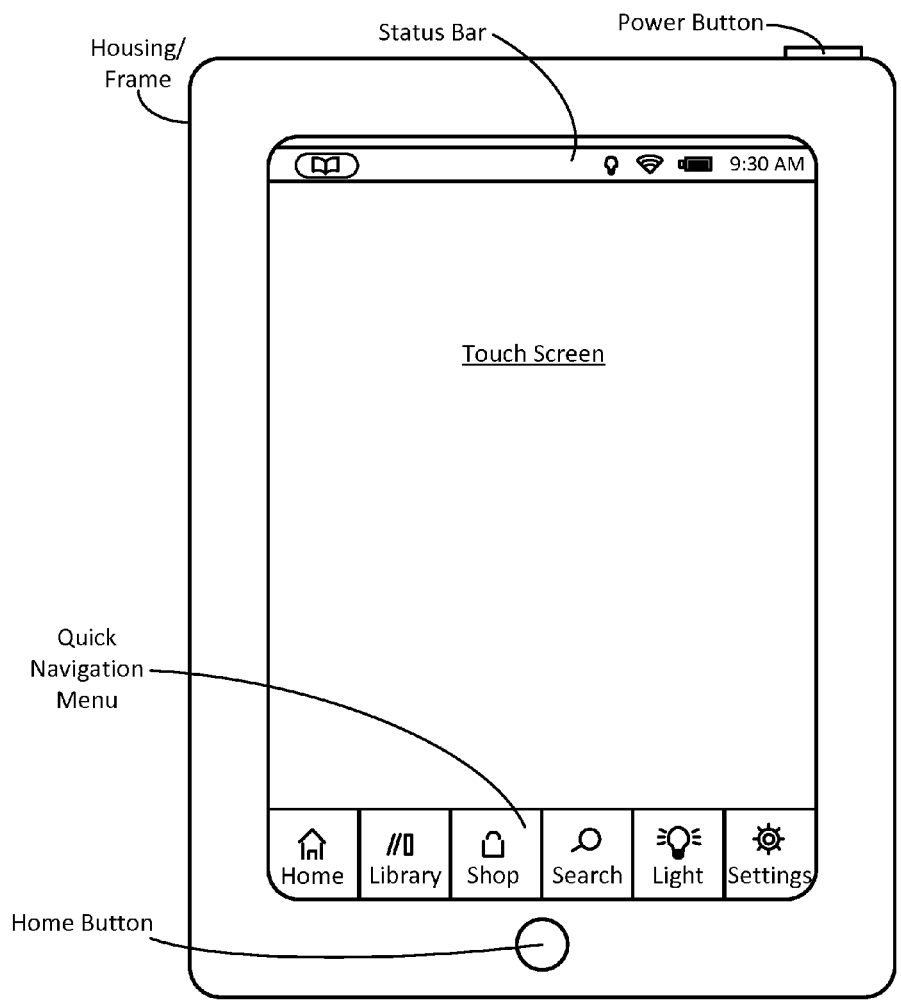
FIGS. 1a-b illustrate an example mobile computing device having a manage active apps mode configured in accordance with an embodiment of the present invention.

Techniques are disclosed for managing active applications on a mobile computing device, generally referred to herein as a manage active apps mode. The manage active apps mode may be invoked by shaking the device while pressing the device's power button (or while manipulating one or more other hardware and/or software user interface control features). The device may include one or more accelerometers, for example, to detect when (and possibly how) the device is being shaken. When invoked, the manage active apps mode may be configured to perform the function of, for example, closing, stopping, force stopping, quitting, or deleting one or more of the device's active applications (all active applications, or some sub-set thereof), for example. In some cases, the function performed may be determined by the direction the device is being shaken, such as if the device is being shaken from side-to-side or up-and-down. In some cases, a confirmation prompt may be provided after invoking the manage active apps mode to ensure that performance of the mode function is desired. Numerous other configurations and variations will be apparent in light of this disclosure.

General Overview

As previously described, mobile computing devices such as tablets, eReaders, and smart phones are commonly used for displaying user interfaces and consumable content and are configured to run multiple software applications (also known as applications or apps) at the same time. In this manner, a device can have multiple applications active at the same time. Some applications may become active automatically (e.g., when the device is powered on) or manually (e.g., when a user selects the specific application), for example. In some instances, a user may desire to manage all of the device's active applications by closing (or stopping, deleting, etc) all of them at the same time. For example, the user may desire to manage all of the active applications to start a new set of active applications or to save device memory, power, or data usage.

Thus, and in accordance with one or more embodiments of the present invention, techniques are disclosed for managing active applications on a mobile computing device by simultaneously manipulating a hardware and/or software user interface control feature and shaking the device, generally referred to herein as a manage active apps mode. In some embodiments, the manage active apps mode may be configured to close, stop, force stop, quit, or delete one or more of the mobile computing device's active applications when invoked. As will be apparent in light of the present disclosure, manipulating a hardware user interface control feature on a mobile computing device may include pressing one or more physical buttons (e.g., press and hold a power button or volume button during the shake), operating a joystick, or twisting a rotating knob, for example, and manipulating a software user interface control feature on a mobile computing device may include, for instance, pressing one or more virtual buttons (e.g., press and hold an icon or touch point on a touch screen display during the shake). For ease of reference, examples are provided in the context of shaking the device while pressing a power button to invoke the manage active apps mode, referred to herein as a press and shake. However, the claimed invention is not intended to be limited to any particular manipulation of any particular hardware and/or software control feature. As used herein, "shake" and "shaking" as used in conjunction with a mobile computing device refer, in addition to their ordinary meaning, to when the magnitude of the device's acceleration exceeds a threshold value. In some embodiments, acceleration information received from one or more accelerometers (or another suitable shake-detecting system) can be used to detect whether (and in some instances, how) a user is shaking the mobile computing device.

As used herein, "application(s)" and "app(s)" refer, in addition to their ordinary meaning, to software or programs for a computing device that serve a user in some capacity or help a user perform an activity, task, or job. As used herein, "active" used in conjunction with application(s) and app(s) refers, in addition to its ordinary meaning, to being currently running, open, or displayed in the foreground and/or background. "Active" may also refer to using device memory, power, and/or data. The functions available using the manage active apps mode may vary based on the device and/or the device's user interface (or operating system), as will be apparent in light of this disclosure. In some embodiments, closing active applications may stop them from running in the foreground, but one or more of the closed applications may still run in the background or may continue to cause use of device memory, power, and/or data. In some such embodiments, stopping, force stopping, or quitting active applications may stop them from running in both the foreground and the background. In some embodiments, managing active applications may include other functions, such as force quitting, ending, or killing active applications. In some embodiments, managing active applications may include any function that makes the applications inactive in some manner.

In some embodiments, the manage active apps mode may be invoked when a display of active applications is being shown on the mobile computing device, such as a list or group of applications active on the device. Applications included in a display of active applications (e.g., a list of active applications) may include any application made active automatically (e.g., when the device is powered on) and/or manually (e.g., started by a user). However, a list of active applications need not include every application active on the device. For example, some devices may separate active applications into categories, such that the techniques described herein can be used on one categorical list of active applications (e.g., active entertainment applications). In such an example, a press and shake input may be used to close all of the active entertainment applications, without affecting the active applications in any other category. In another example, in devices that include multiple user profiles, lists of active applications may be specific to each user profile. In such an example, a press and shake input may be used to close the active applications of one user profile, without affecting the active applications of any other user profile. In still another example embodiment, a press and shake input may be used to close only those active applications that have been affirmatively selected (e.g., with an appropriately placed screen tap) by the user. In still another embodiment, a press and shake input may be used to close all active applications other than those that are designated as exempt from a user-initiated shake-based close request. For instance, certain applications that are necessary for proper operating system function or performance can be exempted so as to not be affected by any press and shake based inputs.

As will be further apparent in light of the present disclosure, the manage active apps mode can be used on any display of active applications, whether that display is a list, group, grid, menu, icon layout, or any other suitable display. In some embodiments, the manage active apps mode may be invoked regardless of whether a display of active applications is being shown on the mobile computing device. In some such embodiments, an additional step may have to be taken to confirm that performance of the manage active apps mode function (e.g., close all active apps, stop all active apps, etc.) is desired. For example, a confirmation pop-up box may appear after performing a press and shake to ensure that the user desired to close all of the active applications.

In some embodiments, the manage active apps mode function performed may be determined by how the device is being shaken (e.g., the direction of the shake). For example, in one embodiment, shaking the device from side-to-side while pressing the power button may cause the active applications to be closed and shaking the device up-and-down while pressing the power button may cause the active applications to be force stopped, as will be discussed in turn. Allowing a user to select the function performed on one or more of the active applications, e.g., based on how the device is being shaken, may enhance the user's experience when managing active applications. In some embodiments, the manage active apps mode may be configured to provide feedback to indicate that the active applications have been closed (or stopped, force stopped, etc.) after the device has been shaken. For example, the feedback may be visual (e.g., an animation or text is displayed), auditory (e.g., a notification sound is played), and/or tactile (e.g., a vibration is provided).

In some embodiments, the manage active apps mode may be configured at a device level (based on the settings of the electronic device or administrative user) and/or at a user profile level (based on the specific user profile being used). For example, in devices having multiple user profiles, the manage active apps mode may be configured to close the active applications in response to a press and shake input when one user profile is active, whereas it may be configured to stop the active applications in response to the press and shake input in another user profile. To this end, the manage active apps mode may be user-configurable, hard-coded, or some combination thereof (e.g., where some aspects are user-configurable and others are hard-coded). Further, the manage active apps mode as variously described herein may be included initially with the user interface (or operating system) of a mobile computing device or be a separate program/service/application configured to interface with an already existing UI for a mobile computing device to incorporate the functionality of the manage active apps mode as variously described herein. In some instances, the manage active apps mode may come as a non-transient computer program product comprising a set of instructions.

Device and Configuration Examples

Figure 1B:
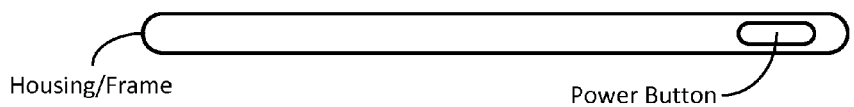

FIGS. 1a-b illustrate an example mobile computing device having a manage active apps mode configured in accordance with an embodiment of the present invention. The device could be, for example, a tablet computer such as the NOOK® Tablet by Barnes & Noble. In a more general sense, the device may be any mobile computing device that has at least one hardware control feature (e.g., a power button, home button) and capability for detecting and/or measuring device acceleration (e.g., using one or more accelerometers), such as a smart phone, eReader, tablet computer, or laptop, for example. In some instances, the mobile computing device may be battery powered and may include a rechargeable battery. In some instances, the mobile computing device may be touch sensitive and include a touch screen display or a non-touch display screen that can be used in conjunction with a touch sensitive surface/interface, such as a track pad. As will be appreciated in light of this disclosure, the claimed invention is not intended to be limited to any particular kind or type of mobile computing device.

As can be seen with the example embodiment shown in FIGS. 1a-b, the device comprises a housing/frame that includes a number of hardware features such as a power button and a press-button (sometimes called a home button herein). A touch screen based user interface (UI) is also provided (although a mobile computing device running the manage active apps mode need not be touch sensitive), which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI touch or non-touch controls and features can be implemented using any suitable conventional or custom technology, as will be appreciated. Although the mobile computing device shown in FIGS. 1a-d uses a touch screen display, other touch sensitive embodiments may include a non-touch screen and a touch sensitive surface such as a track pad, or a touch sensitive housing configured with one or more acoustic sensors, etc. As previously described, the mobile computing device need not be touch sensitive and may receive input from other inputs, such as directional pads, joysticks, physical keyboards, physical buttons, etc.

Continuing with the example mobile computing device shown in FIGS. 1a-b, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used as follows: when the device is awake and in use, tapping the button will display the device's home screen or holding the button will display an active apps screen (e.g., a list of active applications). In one or more embodiments, the power button (or home button) may be used in combination with a shake input (shaking the device) to invoke the manage active apps mode, as variously described herein. Numerous other configurations and variations will be apparent in light of this disclosure, and the claimed invention is not intended to be limited to any particular set of hardware buttons or control features, or device form factor.

Figure 1C:
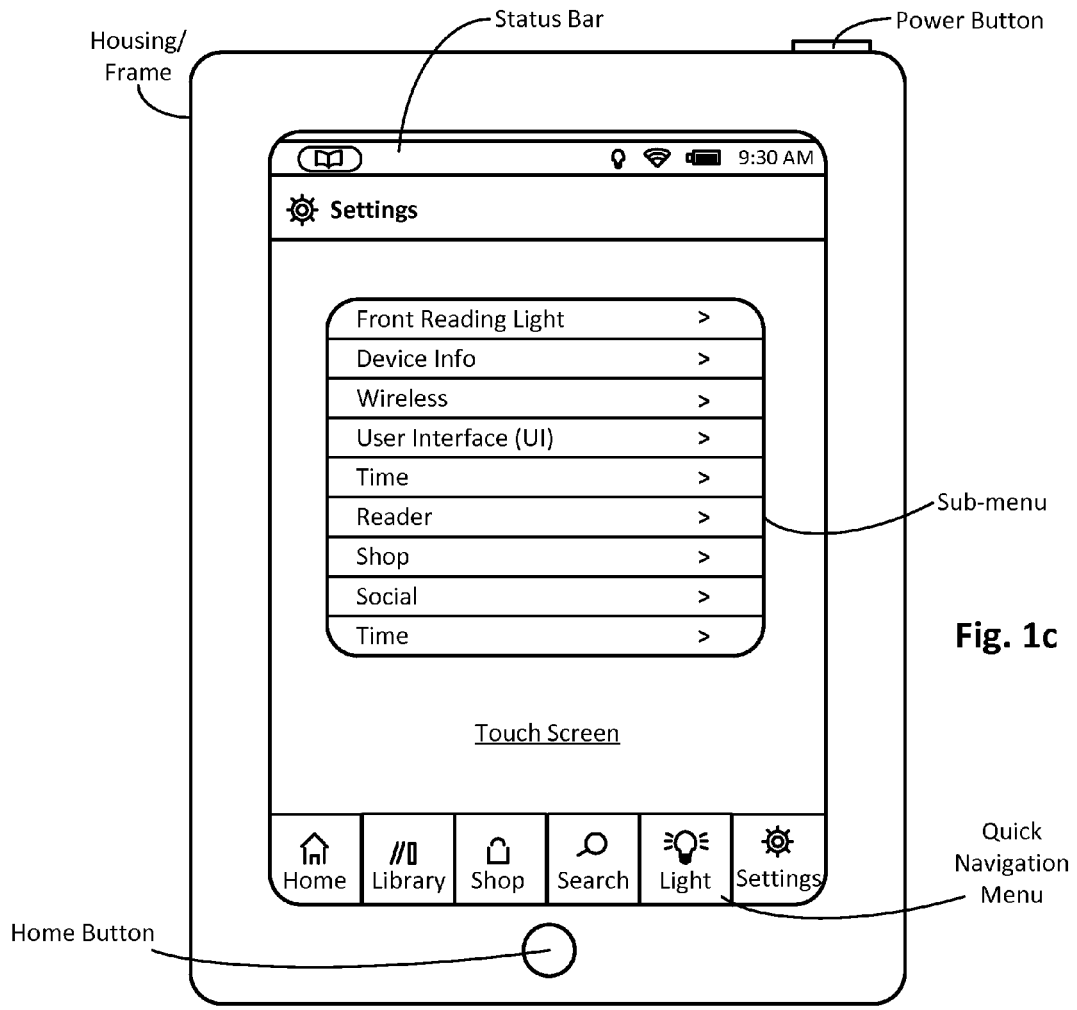
FIGS. 1c-d illustrate example configuration screen shots of the user interface of the mobile computing device shown in FIGS. 1a-b configured in accordance with an embodiment of the present invention.
Figure 1D:
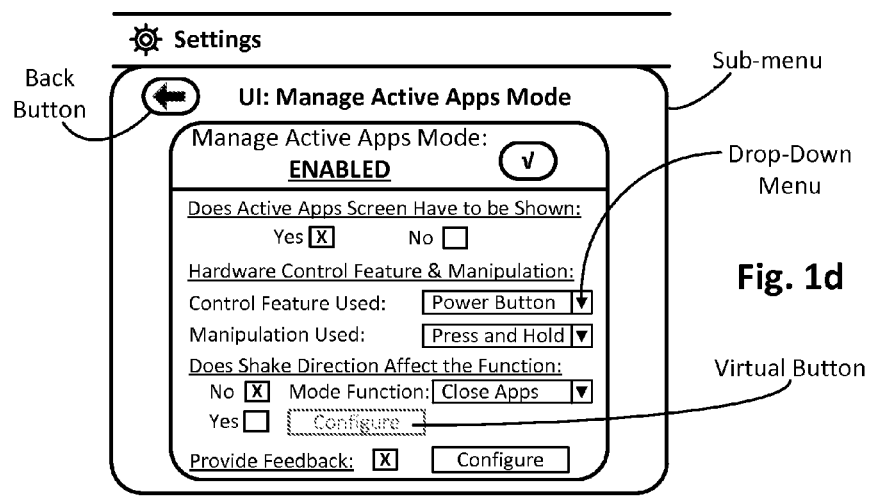

Continuing from FIG. 1a, the user can access a manage active apps configuration sub-menu, such as the one shown in FIG. 1d by tapping or otherwise selecting the Settings option in the quick navigation menu, which causes the device to display the general sub-menu shown in FIG. 1c. From this general sub-menu the user can select any one of a number of options, including one designated User Interface (UI) in this specific example case. Selecting this sub-menu item (with, for example, an appropriately placed screen tap) may cause the manage active apps mode configuration sub-menu of FIG. 1d to be displayed, in accordance with an embodiment. In other example embodiments, selecting the User Interface (UI) option may present the user with a number of additional sub-options, one of which may include a so-called manage active apps mode option, which may then be selected by the user so as to cause the manage active apps mode configuration sub-menu of FIG. 1d to be displayed. Any number of such menu schemes and nested hierarchies can be used, as will be appreciated in light of this disclosure. In other embodiments, the manage active apps mode may be hard-coded such that no configuration is needed or otherwise permitted. The degree of hard-coding versus user-configurability can vary from one embodiment to the next, and the claimed invention is not intended to be limited to any particular configuration scheme of any kind, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal which is then received and processed by the underlying operating system (OS), system software, and circuitry (processor, etc.) of the mobile computing device. In some instances, note that the user need not actually physically touch the touch sensitive surface/interface to provide user input (e.g., when the touch sensitive surface/interface recognizes hovering input). In embodiments where the mobile computing device is not-touch sensitive, input may be provided using a joystick or directional pad and one or more buttons, for example, to provide input similar to touching a touch screen. Additional example details of the underlying OS and circuitry in accordance with some embodiments will be discussed in turn with reference to FIG. 2a. In some cases, the manage active apps mode may be automatically configured by the specific UI or user profile being used. In these instances, the manage active apps mode need not be user-configurable (e.g., if the manage active apps mode is hard-coded or is otherwise automatically configured).

As previously explained, and with further reference to FIGS. 1c and 1d, once the Settings sub-menu is displayed (FIG. 1c), the user can then select the User Interface (UI) option. In response to such a selection, the manage active apps mode configuration sub-menu shown in FIG. 1d can be provided to the user. In this example case, the manage active apps mode configuration sub-menu includes a UI check box that when checked or otherwise selected by the user, effectively enables the manage active apps mode (shown in the Enabled state); unchecking the box disables the mode. Other embodiments may have the manage active apps mode always enabled, or enabled by a switch or button, for example. In some instances, the manage active apps mode may be automatically enabled in response to an action, such as when an active apps screen is displayed, for example. As previously described, the user may be able to configure some of the features with respect to the manage active apps mode, so as to effectively give the user a say in, for example, the function performed using a press and shake input as variously described herein, if so desired.

In the example case shown in FIG. 1d, once the manage active apps mode is enabled, the user can configure various options related to the manage active apps mode. The first settings option—Does Active Apps Screen Have to be Shown—allows the user to set whether an active apps screen needs to be shown to invoke the manage active apps mode. The active apps screen may show active applications in various formats, such as in a list, group, grid, icon view, menu, or any other suitable format. In some instances, the active apps screen may be displayed on a portion of the entire display (e.g., on a portion of the touch screen), such as only half of the display. In other instances, the active apps screen may take up the entire display area, such as is shown in the example screen shot of FIG. 3a. A user may access and display an active apps screen by holding the home button, by pressing an active or recent apps button (whether a hardware button or virtual button), or through any other suitable method. As shown, the Yes box is selected to indicate that the manage apps mode may only be invoked from the active apps screen (e.g., using a press and shake input as described herein). The user may select the No box to allow the manage apps mode to be invoked regardless of whether an active apps screen is shown or displayed. In such a setting (when No is selected), the manage active apps mode may be invoked from any screen.

The next two settings section relates to the Hardware Control Feature & Manipulation (of the hardware control feature). This section includes a setting that allows the user to determine the Control Feature Used to be manipulated in combination with shaking the device to invoke the manage active apps mode. As shown in the corresponding drop-down menu, the control feature is set at the Power Button, but may be any hardware control feature, such as a volume button, a home button, a directional pad, a joystick, a rotating knob, or any other suitable hardware control feature. In this example settings screen, the user can also determine the Manipulation Used for the control feature. As shown in the corresponding drop-down menu, the manipulation is set at a Press and Hold, but may be any appropriate manipulation based on the set control feature, such as a press, rotate, sequence of manipulations, or any other suitable manipulation(s). As previously described, more than one hardware control feature may be used or included (in combination with a shake input) to invoke the manage active apps mode.

The next settings section—Does Shake Direction Affect the Function—relates to whether the direction of the shake (in combination with the manipulation of the hardware control feature as previously described) affects the manage active apps mode function performed (e.g., close active apps, stop active apps, etc.). As shown, the No box is selected, indicating that the shake direction does not affect the function and that any shake causes the same manage active apps mode function. In this example settings screen shot, the user can set the Mode Function performed when the manage active apps mode is invoked and as shown in the corresponding drop-down menu, the function is set to Close Apps (close active applications). Other selectable mode functions may include stopping, force stopping, quitting, or deleting one or more active applications, or other suitable functions depending on the mobile computing device being used. The user may select the Yes box to set that the shake directions does affect the function. After selecting the Yes box, the user can configure what functions are performed based on what direction the device is being shaken using the Configure virtual button. For example, the user may set the manage active apps mode such that an up-and-down shake causes all active applications to be closed and a side-to-side shake causes all active applications to be force stopped, as will be discussed in reference to FIGS. 4a-c. In another embodiment, some applications can be effected by one type of shake (e.g., horizontal shake impacts communication apps such as email, phone and texting applications), and other active applications can be effected by another type of shake (e.g., vertical shake impacts tool-based applications such as word processor, spreadsheet and drawing applications). Such shake-type/application pairings can be user-configurable in accordance with some embodiments, while in other embodiments are hard-coded. Further note that some applications can be effectively exempted from shake-based functions if so desired, such that those applications will not be affected by shaking of the device when active.

The next settings option allows the user to set if the manage active apps mode will Provide Feedback after the function (e.g., close active apps, stop active apps, etc.) has been performed (e.g., in response to a press and shake input). When selected (which is the case in this example), the user may be able to configure the type of feedback provided by the manage active apps mode. For example, this may include selecting from various visual, auditory, and/or tactile feedback types. Visual feedback used to indicate that the mode function was performed may include various animations (e.g., the popping of a balloon), transition effects (e.g., fading out to the home screen), or textual displays (e.g., a display of "No Active Apps"); auditory feedback may include various sounds (e.g., a beeping sound) or music (e.g., a quick tune); and tactile feedback may include vibrating the device, just to name a few examples. Numerous configurations and features of the manage active apps mode will be apparent in light of this disclosure.

In one or more embodiments, the user may specify the user profiles in which the manage active apps mode is available. Such a configuration feature may be helpful, for instance, in a smart phone or tablet computer or other multifunction mobile computing device that includes multiple user profiles (as opposed to a device having only one user profile). In one example case, for instance, the administrative user of the device may be able to designate which user profiles can use the manage active apps mode as variously described herein, or determine whether or not the users have access to configure the manage active apps mode. In some embodiments, the manage active apps mode may also be related or tied to another aspect of the device's UI (or operating system), such that the manage active apps mode is only available when the other aspect is running or invoked. For example, the manage active apps mode may only be available, active, or running when an active apps screen is displayed (e.g., using an active apps button).

As can be further seen in FIG. 1d, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and 1d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 2A:
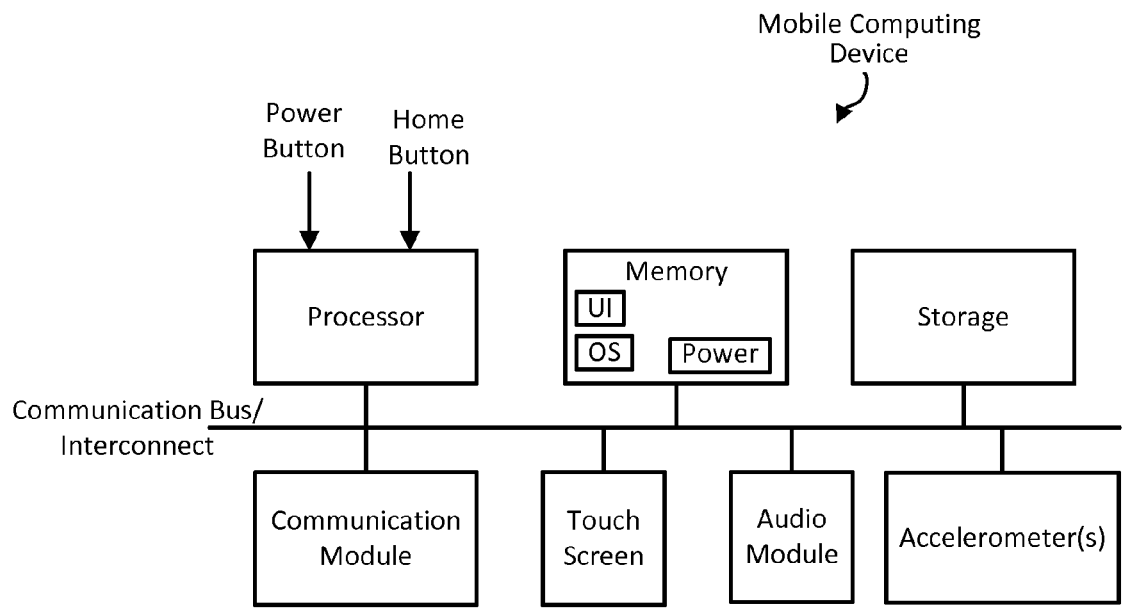
FIG. 2a illustrates a block diagram of a mobile computing device configured in accordance with an embodiment of the present invention.

FIG. 2a illustrates a block diagram of a mobile computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). Further note that although a touch screen display is provided, other touch sensitive embodiments may include a non-touch screen and a touch sensitive surface such as a track pad, or a touch sensitive housing configured with one or more acoustic sensors, etc. In this manner, a non-touch sensitive computing device can become a touch sensitive computing device by adding an interfacing touch sensitive component. However, as previously explained, some embodiments may be non-touch sensitive. The principles provided herein equally apply to any such mobile computing device. For ease of description, examples are provided with touch screen technology.

The touch sensitive surface (touch sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a manage active apps mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments® OMAP3621 applications processor), and may include one or more co-processors or controllers to assist in device control. In this example case, the processor receives input from the user, including input from or otherwise derived from the power button, home button, and touch sensitive surface. The processor may also receive acceleration information to determine if the device is being shaken from, for example, one or more accelerometers (as discussed herein). In other embodiments, the processor may be configured to receive input from other hardware control features, such as other buttons, directional pads, or twistable knobs, for example, to determine if such control features are being manipulated in combination with a shake input to invoke the manage active apps mode as variously described herein. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The accelerometer(s) can include any conventional or customary technology, including piezoelectric, piezoresistive, capacitive, magnetoresistive, and micro-electro-mechanical system (MEMS) technology, for example. The number of accelerometers may affect the amount of information that can be obtained from a shake input. For example, in embodiments of the manage active apps mode where the direction of the shake determines the function performed, multiple accelerometers may be needed to detect the direction the device is being shaken (e.g., side-to-side vs. up-and-down). Other componentry or systems may be used with (or in place of) one or more accelerometers to produce acceleration information (or detect a shake input) used to invoke the manage active apps mode as variously described herein, such as one or more gyroscopes, for example.

The display can be implemented, for example, with a 6-inch E-ink Pearl 800×600 pixel screen with Neonode® zForce® touch screen, or any other suitable display and touch screen interface technology. The communications module can be, for instance, any suitable 802.11b/g/n WLAN chip or chip set, which allows for connection to a local network so that content can be downloaded to the device from a remote location (e.g., content provider, etc., depending on the application of the display device). In some specific example embodiments, the device housing or frame that contains all the various componentry measures about 6.5" high by about 5" wide by about 0.5" thick, and weighs about 6.9 ounces. Any number of suitable form factors can be used, depending on the target application (e.g., laptop, smart phone, etc.). The device may be smaller, for example, for smart phone and eReader applications and larger for tablet computer applications.

The operating system (OS) module can be implemented with any suitable OS, but in some example embodiments is implemented with Google Android OS or Linux OS or Microsoft OS or Apple OS. In other example embodiments, the OS module may be implemented with any OS that can run multiple applications. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content, or to aurally present a confirmation query regarding a given press and shake input (e.g., verbal prompt, "close active apps"?). In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1a, 1c-d, 3a-f, 4a-c, and 5a-c, in conjunction with the manage active apps mode methodologies demonstrated in FIG. 6, which will be discussed in turn.

Client-Server System

Figure 2B:
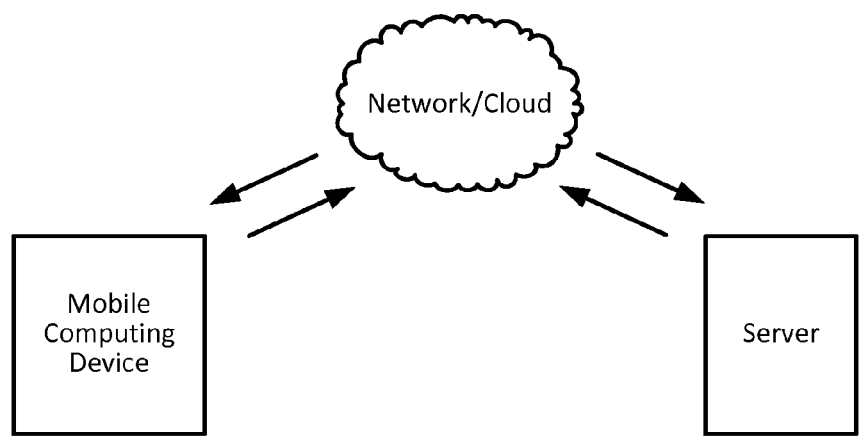
FIG. 2b illustrates a block diagram of a communication system including the mobile computing device of FIG. 2a configured in accordance with an embodiment of the present invention.

FIG. 2b illustrates a block diagram of a communication system including the mobile computing device of FIG. 2a configured in accordance with an embodiment of the present invention. As can be seen, the system generally includes a mobile computing device that is capable of communicating with a server via a network/cloud. In this example embodiment, the mobile computing device may be, for example, an eReader, a mobile phone, a smart phone, a laptop, a tablet computer, or any other suitable mobile computing device. The network/cloud may be a public and/or private network, such as a private local area network operatively coupled to a wide area network such as the Internet. In this example embodiment, the server may be programmed or otherwise configured to receive content requests from a user via the mobile computing device and to respond to those requests by providing the user with requested or otherwise recommended content. In some such embodiments, the server may be configured to remotely provision a manage active mode as provided herein to the mobile computing device (e.g., via JavaScript or other browser based technology). In other embodiments, portions of the methodology may be executed on the server and other portions of the methodology may be executed on the device. Numerous server-side/client-side execution schemes can be implemented to facilitate a manage active apps mode in accordance with one or more embodiments, as will be apparent in light of this disclosure.

Manage Active Apps Mode Examples

Figure 3A:
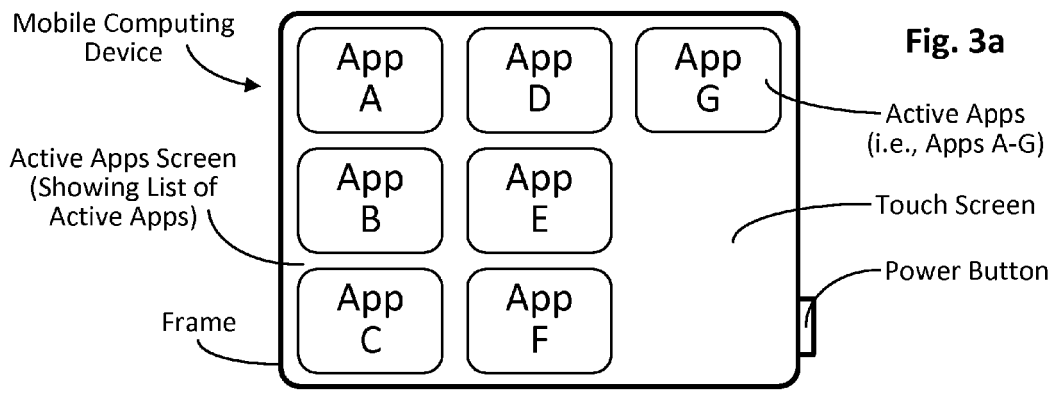
FIGS. 3a-f collectively illustrate an example manage active apps mode press and shake input for closing a list of active applications, in accordance with an embodiment of the present invention.

FIGS. 3a-e collectively illustrate an example manage active apps mode press and shake input for closing a list of active applications, in accordance with an embodiment of the present invention. FIG. 3a illustrates a screen shot of an example mobile computing device having a manage active apps mode configured in accordance with one or more embodiments of the present invention. The mobile computing device includes a frame that houses a touch sensitive surface, which in this example, is a touch screen display. As shown, the mobile computing device also includes a power button located on the lower right side of the device in this particular orientation. In some embodiments, the touch sensitive surface may be separate from the display, such as is the case with a track pad. As previously described, the mobile computing device need not be touch sensitive, but examples are provided herein in the context of a touch sensitive mobile computing device for ease of description. The touch sensitive surface/interface of the mobile computing device may receive user input via direct contact (e.g., touch input) or proximate contact (e.g., hovering input). The mobile computing device may also receive user input by manipulating a hardware control feature (e.g., pressing the power button), shaking the device, providing audio to the microphone of the device (if one is included), or any other suitable way of providing input to a mobile computing device.

The screen shot in FIG. 3a shows a list of active applications and is referred to herein as an active apps screen. As previously described, a user may access and display the active apps screen by, for example, holding the home button, by pressing an active or recent apps button (whether a hardware button or virtual button), or through any other suitable method. The active apps screen may show active applications in various formats, such as in a list, group, grid, menu, icon layout, or any other suitable display. In some instances, a user may be able to switch between active applications from the active apps screen. In some instances, the active apps screen may be displayed on a portion of the entire display (e.g., on a portion of the touch screen), such as only half of the display. In other instances, the active apps screen may take up the entire display area, such as is shown in the example screen shot of FIG. 3a. Continuing with FIG. 3a, seven active applications are shown, i.e., Apps A-G. Although the manage active apps mode is illustrated herein as performing a function on all of the active applications in the active apps screen, it may be used to perform a function on a smaller list or group of applications. For example, if the active applications were divided into categories (e.g., entertainment apps, game apps, utility apps, etc.), then the manage active apps mode may be used to close all of the active applications in a particular category using a press and shake input when just that category is displayed. In still another embodiment, the user can select various ones of the active apps displayed (e.g., with appropriately placed screen taps), thereby giving the user greater control of which apps are to be operated on. In such a case, the selected apps can be highlighted or otherwise visually accentuated so that the user can see which apps have been selected and will be acted upon.

Figure 3B:
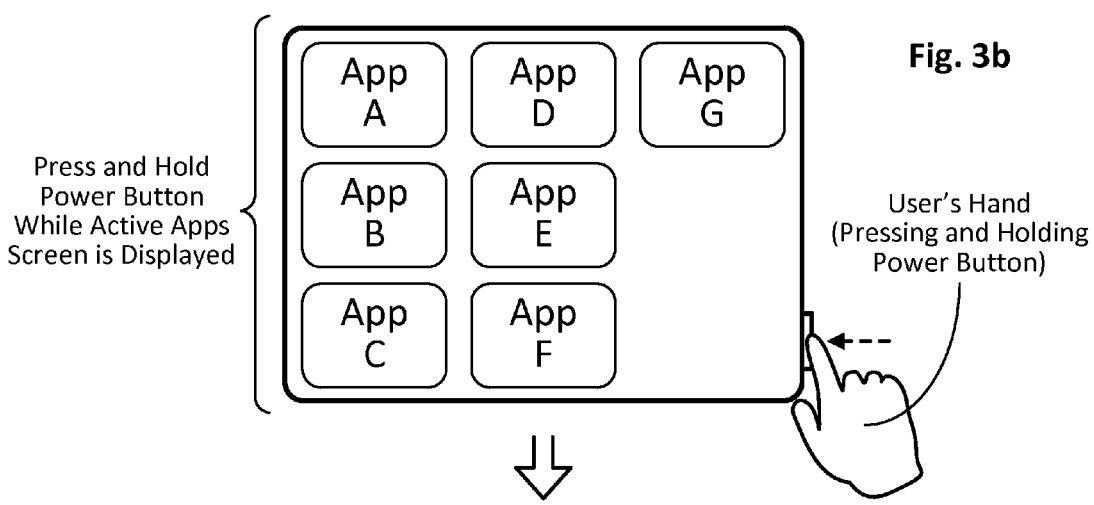
Figure 3C:
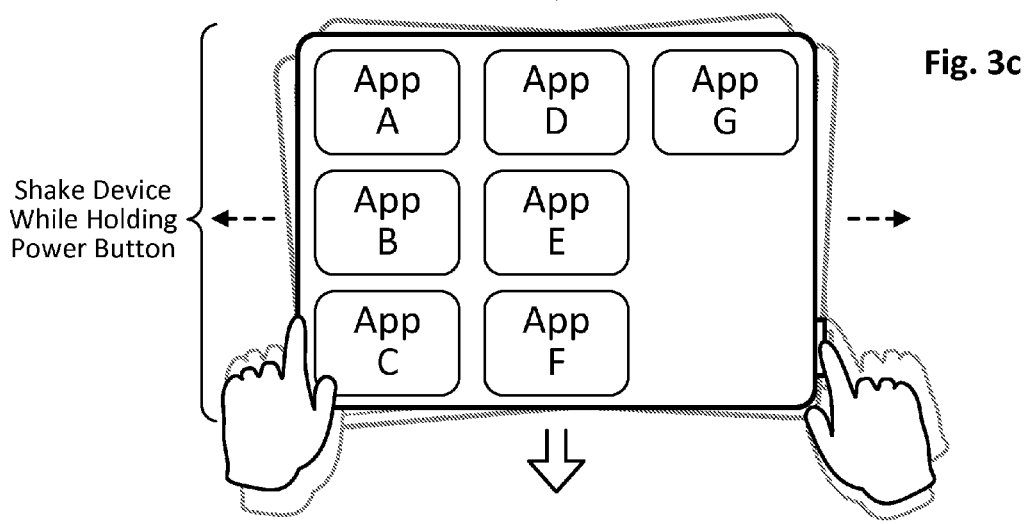
Figure 3D:
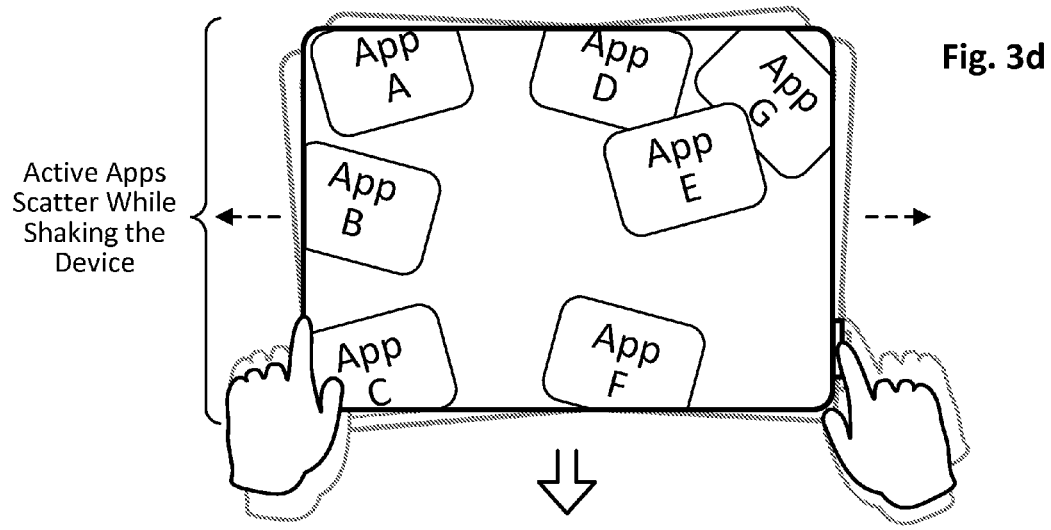

FIG. 3b illustrates pressing and holding the power button while an active apps screen is being displayed. In this example, a user is using a finger (from the user's hand) to press the power button. In some embodiments, pressing and holding the power button from the active apps screen may cause no response until a shake input is also provided, for example. In other embodiments, pressing and holding the power button may cause shake options to be displayed, for example, as will be discussed in turn. As previously described, in other embodiments, manipulation(s) of one or more other hardware control features may be used (in combination with a shake input as variously described herein) to invoke the manage active apps mode. Continuing to FIG. 3c, in this screen shot, the device is being shaken while the power button is being held. In other words, a press and shake input is being provided to the device. In some instances, an action or feedback may be provided while the device is being shaken. For example, as shown in FIG. 3d, the active applications are being scattered about the touch screen while the device is being shaken. Other actions or feedback may be provided, including visual, auditory, and/or tactile feedback.

In some embodiments, the shake input provided (e.g., shown in FIGS. 3c-d) may have to meet certain criteria and/or exceed a certain threshold value to invoke the manage active apps mode. For example, the shake input may have to be in a certain direction (e.g., side-to-side or up-and-down) or exceed a minimum threshold (e.g., based on the force of the shake or the amount of shakes made). In some such embodiments, the criteria and/or threshold value may be user-configurable, hard-coded, or some combination thereof (e.g., where the minimum magnitude of adequate acceleration/shake input is hard-coded but the direction of the shake input needed to invoke the manage active apps mode is user-configurable). As previously described, the shake input (or acceleration information) may be detected using one or more accelerometers, for example.

Figure 3E:
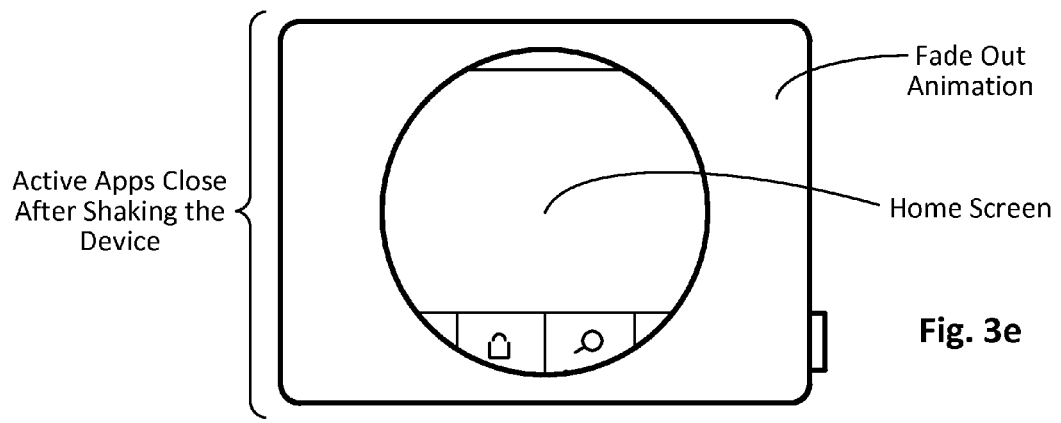
Figure 3F:
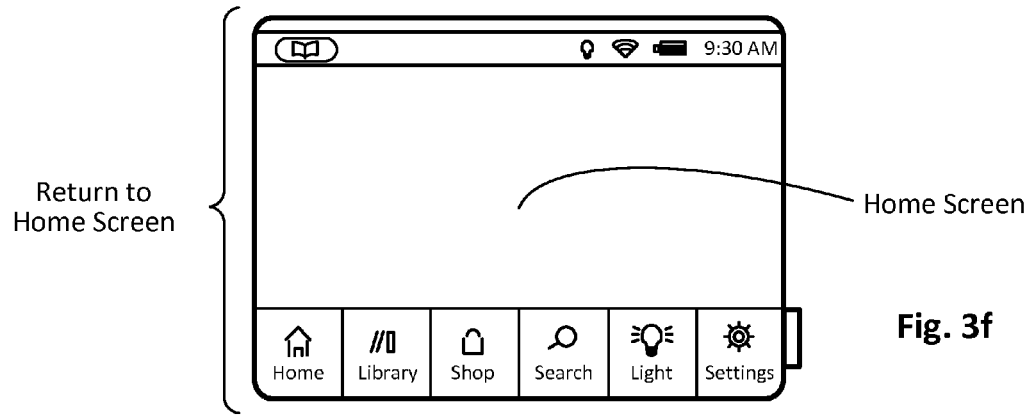

Continuing with FIG. 3e, the manage active apps mode function may be performed after the press and shake has been initiated (which may include a shake input that meets certain criteria and/or exceeds a certain threshold value), upon stopping the shake input, or upon releasing the power button, for example. In this example embodiment, the manage active apps mode is configured to close all of the active applications; however, in other embodiments, the manage active apps mode may be configured to perform another suitable function on all of the active applications, such as stopping, force stopping, quitting, or deleting the active applications, for example. After the press and shake input is used to invoke the manage active apps mode as described herein (e.g., as shown in FIGS. 3c-d), feedback may be provided to indicate to the user that the function has been performed, such as is shown in FIG. 3e. An animation is provided in FIG. 3e to indicate that all of the active applications have been closed. In particular, the animation shown in this example case is a fade out animation from an active apps screen where all of the applications have been scattered off of the screen to the home screen of the device shown in FIG. 3f. As previously described, the feedback may be visual, auditory, and/or tactile and the feedback (along with other features of the manage active apps mode) may be user-configurable, hard-coded, or some combination thereof.

Figure 4A:
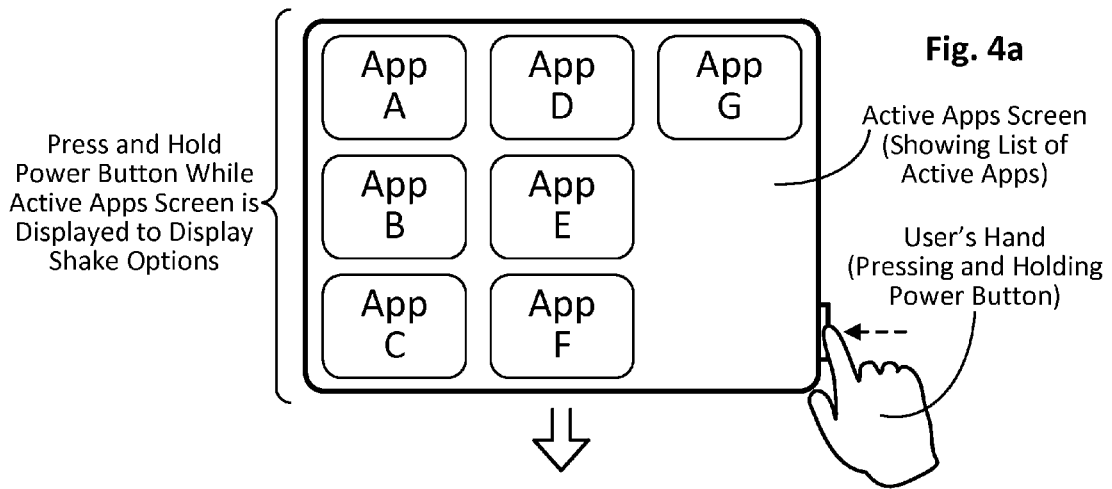
FIGS. 4a-c collectively illustrate an example manage active apps mode press and shake input where the direction of the shake determines the mode function performed, in accordance with an embodiment of the present invention.
Figure 4B:
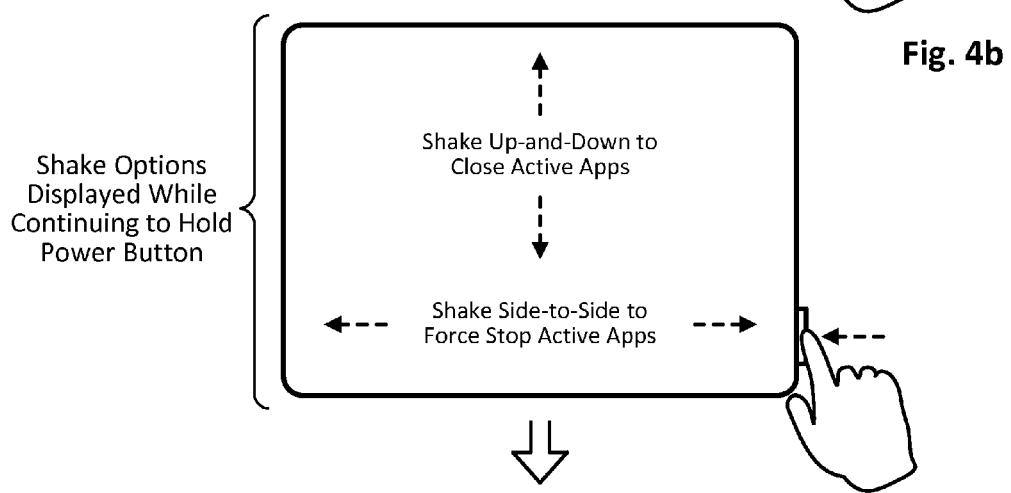
Figure 4C:
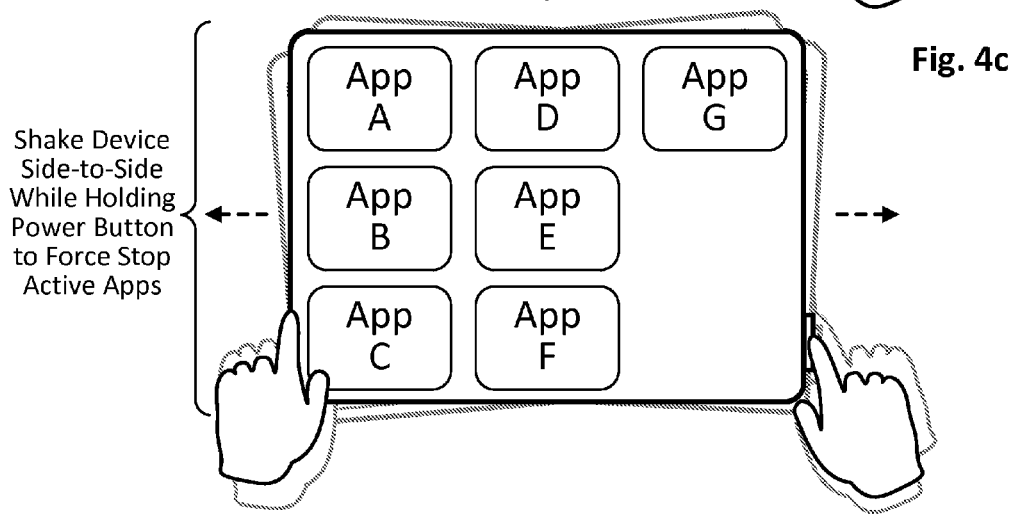

FIGS. 4a-c collectively illustrate an example manage active apps mode press and shake input where the direction of the shake determines the mode function performed, in accordance with an embodiment of the present invention. FIG. 4a shows the same screen shot as FIG. 3b, where the user is pressing and holding the power button while the active apps screen is being displayed on the mobile computing device. However, in this embodiment, holding the power button causes the available shake options to be displayed, as shown in FIG. 4b. In some embodiments, the characteristics of the shake input and/or characteristics of the manipulation(s) of the one or more control features may affect the manage active apps mode function performed. In this example embodiment, the direction of the shake input affects the mode function performed. The shake options shown in FIG. 4b include Shake Up-and-Down to Close Active Apps and Shake Side-to-Side to Force Stop Active Apps. In other words, while pressing and holding the power button, the user can shake the device up-and-down in its current orientation to close the active applications (i.e., Apps A-G) or shake the device side-to-side to force stop the active applications. As previously described, in embodiments where the direction the device is being shaken affects the mode function performed, the shake direction and corresponding mode function may be user-configurable, hard-coded, or some combination thereof. The shake options shown in FIG. 4b may not be displayed or otherwise provided to assist the user in some embodiments (and thus include some degree of memorization by the user). FIG. 4c shows the user shaking the mobile computing device from side-to-side while holding the power button to force stop the device's active applications.

Figure 5A:
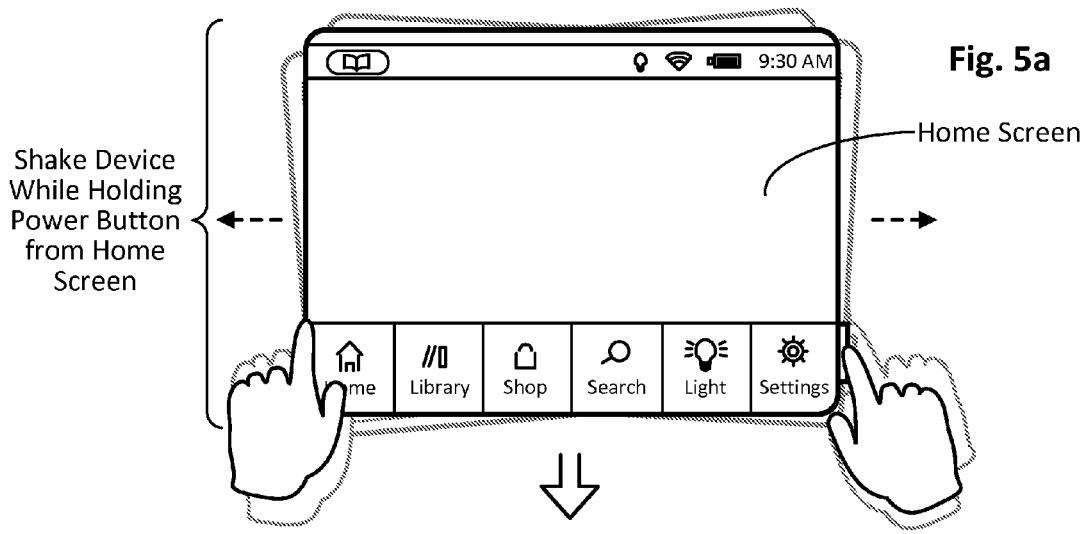
FIGS. 5a-c illustrate an example manage active apps mode including a confirmation prompt, in accordance with an embodiment of the present invention.
Figure 5B:
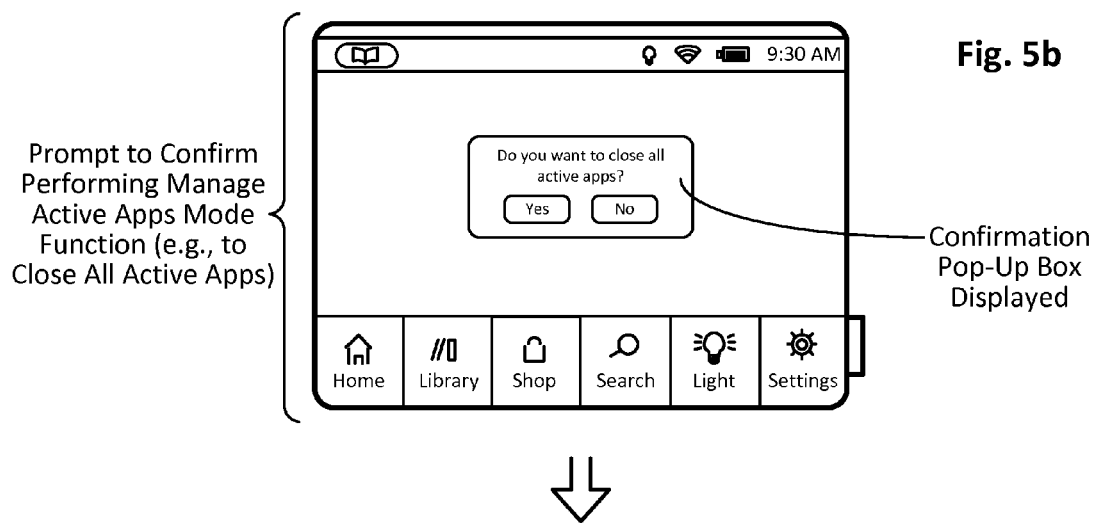
Figure 5C:
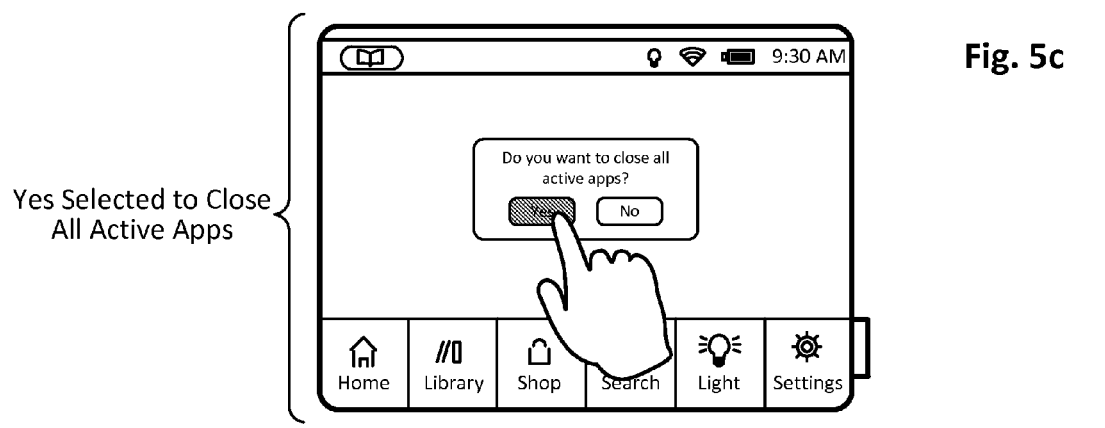

FIGS. 5a-c illustrate an example manage active apps mode including a confirmation prompt, in accordance with an embodiment of the present invention. FIG. 5a shows a screen shot of a mobile computing device (such as the device shown in FIG. 3a and described herein) displaying a home screen. FIG. 5a also shows a user shaking the device while holding its power button, i.e., performing a press and shake, to invoke the manage active apps mode. In this example embodiment, a confirmation prompt is included to verify that invoking the manage active apps mode was desired before performing the mode function (e.g., close all active applications, stop all active applications, etc.). The confirmation prompt as shown in FIG. 5b is a confirmation pop-up box, which is displayed to ensure that performance of the manage active apps mode function was desired. The confirmation pop-up box includes a Yes virtual button and a No virtual button to allow the user to select the desired option (e.g., using direct or proximate contact via the touch screen in this embodiment). FIG. 5c shows the user selecting the Yes virtual button to confirm closing all active applications. Confirmation prompts may be helpful when the manage active apps mode is invoked from a screen other than the active apps screen (such as from a home screen as shown in FIGS. 5a-c) to ensure that performing the mode function was desired. Numerous different manage active apps mode examples and configurations will be apparent in light of this disclosure.

Methodology

Figure 6:
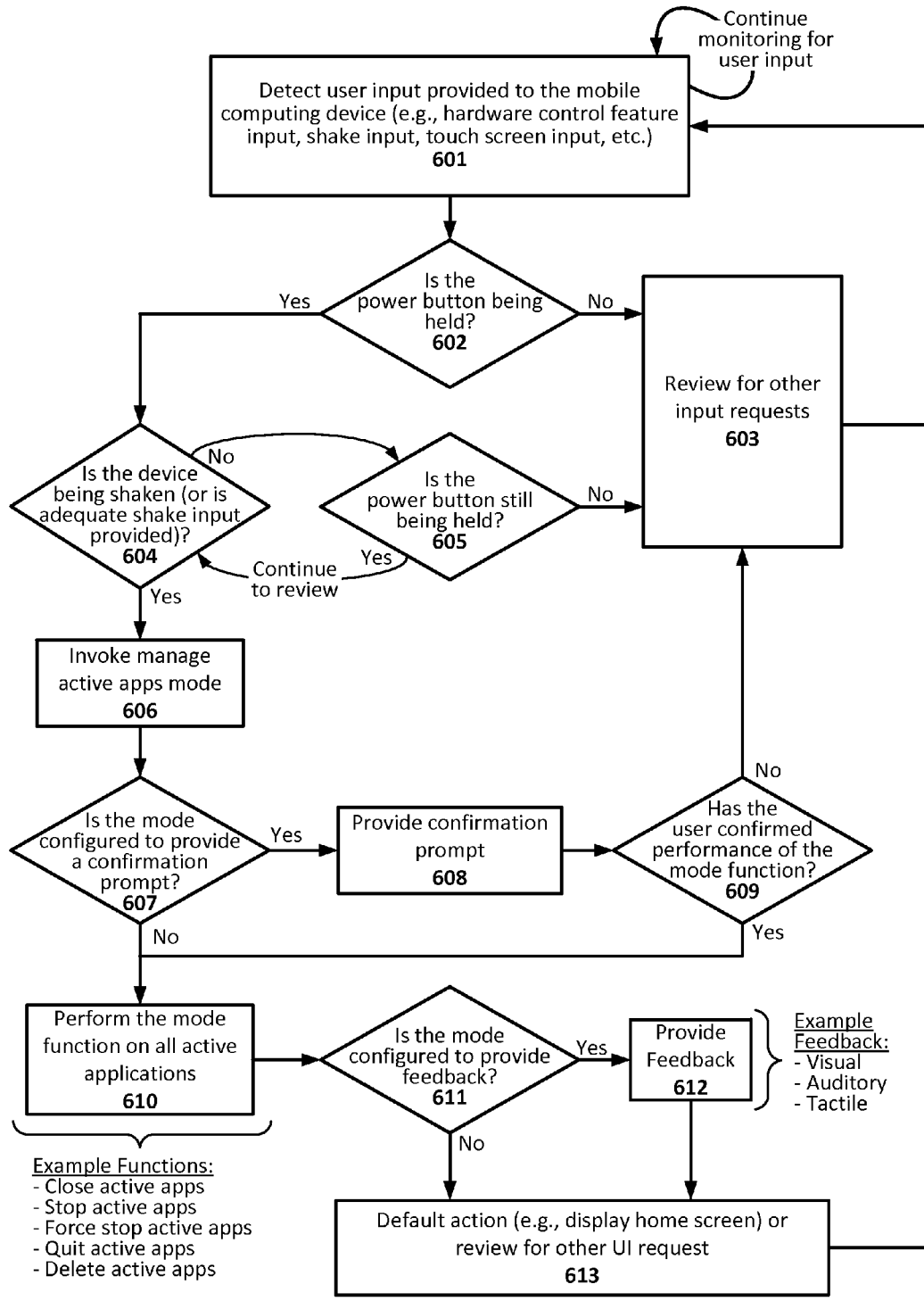
FIG. 6 illustrates a method for providing a manage active apps mode in a mobile computing device, in accordance with one or more embodiments of the present invention.

FIG. 6 illustrates a method for providing a manage active apps mode in a mobile computing device, in accordance with one or more embodiments of the present invention. This example methodology may be implemented, for instance, by the UI module of the mobile computing device shown in FIG. 2a, or the mobile computing device shown in FIG. 2b (e.g., with the UI provisioned to the client by the server). To this end, the UI and the manage active apps mode can be implemented in software, hardware, firmware, or any combination thereof, as will be appreciated in light of this disclosure.

The method generally includes sensing or detecting user input provided to the mobile computing device. The user input may be provided from one or more hardware control features, such as when the control features are manipulated (e.g., pressing a power button). The user input may also be provided from interacting with the device in some other manner, such as by shaking the device (shake input), talking near the device (audio input), etc. In embodiments including a touch screen or other touch sensitive interface, the mobile computing device may be able to detect contact, whether direct or proximate (e.g., via hovering input). These main detections can be used in various ways to implement UI functionality, including a manage active apps mode as variously described herein, as will be appreciated in light of this disclosure. For ease of description, pressing a power button will be used for the manipulation of one or more hardware control features used (in combination with a shake input) to invoke the manage active apps mode to explain the methodology illustrated in FIG. 6. However, the claimed invention is not intended to be limited to this specific example.

In the example case illustrated in FIG. 6, the method includes detecting 601 user input provided using the mobile computing device. As previously described, the user input may include hardware control feature input, shake input, touch screen input (in embodiments including a touch screen), or some other suitable user input. In general, the monitoring for user input is effectively continuous. The method continues with determining 602 if the power button of the mobile computing device is being held. This may include an additional step of detecting if the power button has been pressed. If the power button of the device is not being held, the method can continue by reviewing 603 for other input requests. If the power button of the device is being held, the method continues by determining 604 if the device is being shaken (or if adequate shake input is being provided). In some embodiments, the device shake input may have to meet certain criteria and/or meet a threshold value to invoke the manage active apps mode, for example. This may include determining if the detected device acceleration received from, for example, one or more accelerometers, meets or exceeds a minimum magnitude. In some instances, determining if the shake input is adequate to invoke the manage active apps mode may include determining if the device is being shaken in a particular direction, such as from side-to-side or up-and-down, for example. Attributes of the shake input may be measured based on input from one or more accelerometers, for example.

If it is determined that the device is not being shaken (or that the shake input is inadequate to invoke the manage active apps mode), the method determines 605 if the power button is still being held. If the power button is not still being held, the method may continue by reviewing 603 for other input requests. If the power button is still being held, the method continues to review for until the device has been shaken (or until an adequate shake input has been provided) or until the power button is released. If the device is being shaken (or an adequate shake input is provided) while the power button is being held, the method continues by invoking 606 the manage active apps mode. Once invoked, the method continues by determining 607 if the manage active apps mode is configured to provide a confirmation prompt to ensure that performing the mode function is desired. If the mode is configured to provide a confirmation prompt, then the method continues by providing 608 the confirmation prompt to the user. For example, a confirmation pop-up box may be displayed to allow the user to select whether to perform the manage active applications mode (e.g., as shown in FIG. 5b). The method continues by determining 609 if the user has confirmed performance of the mode function. If the user has not confirmed performance of the mode function (e.g., by selecting the No virtual button shown in FIG. 5b), then the method can continue by reviewing for other input requests.

If the user has confirmed performance of the mode function (e.g., by selecting the Yes virtual button as shown in FIG. 5c) or if the mode was not configured to provide a confirmation prompt (from step 607), the method continues by performing 610 the manage active apps mode function on all targeted active applications. Recall that in some embodiments, a subset of the active applications can be selected and/or otherwise designated, and/or that some of the active apps may be exempt from the press and shake app management function. The manage active apps mode function may include closing, stopping, force stopping, quitting, and/or deleting all targeted active applications, for example. As previously described, the mode function performed may be determined by the characteristics of the input, such as the shake input. For example, the direction of the shake input (e.g., side-to-side vs. up-and-down) may determine the mode function performed. Regardless, the mode function performed may be user-configurable (e.g., see FIG. 1d), hard-coded, or some combination thereof. The method continues by determining 611 if the manage active apps mode is configured to provide feedback that the mode function has been performed on all active applications. If the manage active apps mode is configured to provide feedback, then the method continues by providing 611 the feedback as configured. As previously described, whether or not feedback is provided may be user-configurable (e.g., see FIG. 1d), hard-coded, or some combination thereof. The feedback may be visual (e.g., an animation or transition effect), auditory (e.g., a sound or music), and/or tactile (e.g., haptic vibrations). The type of feedback provided may also be user-configurable (e.g., see FIG. 1d), hard-coded, or some combination thereof.

Regardless of whether the manage active apps mode is configured to provide feedback, the method continues with a default action 612, such as displaying the device's home screen or doing nothing until further UI requests or user input is received. The method may continue to monitor for user input indefinitely or as otherwise desired, so that any user input provided can be evaluated for use in the manage active apps mode, if appropriate. As previously described, the manage active apps mode may be user profile specific, such that it is only available, enabled, and/or active when certain user profiles are being used. In addition, the manage active apps mode may have different configurations for different user profiles, particularly where the manage active apps mode is user-configurable. In some embodiments, the manage active apps mode may only be available, enabled, and/or active when an active apps screen is displayed (e.g., when multiple active applications are displayed in a list, group, menu, or some other suitable format). In this manner, power and/or memory may be conserved since the manage active apps mode may only run or otherwise be available when an active apps screen is displayed.

Numerous variations and embodiments will be apparent in light of this disclosure. One example embodiment of the present invention provides a mobile computing device including a display for displaying content to a user, at least one user interface control feature, at least one accelerometer for detecting when the device is being shaken, and a user interface. The user interface includes a manage active apps mode that can be invoked in response to user input. The user input includes shaking the device while the at least one user interface control feature is being manipulated, wherein the manage active apps mode is configured to perform a function on one or more active applications. In some cases, the manage active apps mode is configured to perform one of closing, stopping, force stopping, quitting, and deleting the one or more active applications. In some cases, the user interface control feature comprises at least one of a power button of the device and a touch sensitive point of the device. In some cases, the display is a touch screen display. In some cases an animation is provided when the device is being shaken. In some cases, the direction the device is being shaken determines the function performed. In some cases, a confirmation prompt is provided after invoking the manage active apps mode to confirm performance of the function on the one or more active applications. In some cases, feedback is provided after the function has been performed to indicate that the function has been performed, the feedback being visual, auditory, and/or tactile. In some cases, the manage active apps mode can only be invoked while an active apps screen is being displayed. In some cases, the manage active apps mode is user-configurable.

Another example embodiment of the present invention provides a mobile computing device including a display having a touch screen interface and for displaying content to a user, at least one hardware control feature that can be manipulated, at least one accelerometer for measuring device acceleration, and a user interface. The user interface included a manage active apps mode that can be invoked in response to user input. The user input includes a shake input while the at least one hardware control feature is being manipulated, wherein the manage active apps mode is configured to perform one of a close, stop, force stop, quit, and delete function on one or more active applications. In some cases, the shake input used to invoke the manage active apps mode exceeds a minimum acceleration threshold. In some cases, the hardware control feature is a power button of the device. In some cases, the direction of the shake input determines the function performed on the one or more active applications.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to (in response to user input provided to a mobile computing device capable of displaying content) invoke a manage active apps mode in the device (the user input including shaking the device while at least one user interface control feature is being manipulated), wherein the manage active apps mode is configured to perform a function on one or more active applications, and perform the function on the one or more active applications. In some cases, the manage active apps mode is configured to perform one of closing, stopping, force stopping, quitting, and deleting the one or more active applications. In some cases, the user interface control feature comprises at least one of a power button of the device and a touch sensitive point of the device. In some cases, the mobile computing device is a touch sensitive device including a touch screen. In some cases, the direction the device is being shaken determines the function performed. In some cases, feedback is provided after the function has been performed to indicate that the function has been performed, the feedback being visual, auditory, and/or tactile.

The foregoing description of the embodiments of the invention has been presented for the purposes of illustration and description. It is not intended to be exhaustive or to limit the invention to the precise form disclosed. Many modifications and variations are possible in light of this disclosure. For example, all active functions may be understood to include all active functions that have been designated or otherwise associated with the manage active apps mode, in accordance with some embodiments. Thus, in some such embodiments, note that the manage active apps mode can be configured to perform a function on a sub-set of the currently active applications, such that some active applications remain active after the shaking event. As will be further appreciated, applications that are necessary to device operation (if any) and/or that are otherwise designated as 'exempt' from a shake-induced function will not be subjected to the shake-induced function. It is intended that the scope of the invention be limited not by this detailed description, but rather by the claims appended hereto.

What is claimed is:

1. A mobile computing device, comprising:
   a display having a touch screen interface and for displaying content to a user;
   at least one hardware control feature that can be manipulated including a power button;
   at least one accelerometer for measuring device acceleration; and
   a user interface including a manage active apps mode invoked in response to user input, the user input including a shake input while the power button is depressed, wherein the manage active apps mode, when invoked, to performs one of a close, stop, force stop, quit, and delete function on one or more active applications in response to the shaking input exceeding a minimum threshold based on the device acceleration,
   wherein the user interface continues to review for shaking input that exceeds the minimum threshold while the power button is depressed and wherein the user interface reviews for other user input in response to release of the power button;
   wherein the manage active apps mode can only be invoked while an active apps screen is being displayed;
   wherein the shake input includes a direction that dictates the function performed such that shaking the device in an up-and-down direction relative to the content displayed on the display causes a first function and shaking the device in a side-to-side manner relative to the content displayed on the display causes a second function different than the first function, and wherein the first and second functions are user-configurable;
   wherein a confirmation prompt is provided after invoking the manage active apps mode and before performing the first or second function to confirm performance of the first or second function is desired, such that if user confirmation input is provided via the confirmation prompt then the first or second function is performed, and if user rejection input is provided via the confirmation prompt then the first or second function is not performed and the user interface reviews for other user input; and
   wherein feedback is provided after the first or second function has been performed to indicate that the first or second function has been performed, the feedback being at least one of visual, auditory, and tactile.

2. The device of claim 1 wherein the shaking input minimum threshold is user-configurable.

3. The device of claim 1 wherein an animation is displayed when the device is being shaken while the power button is depressed.

4. A non-transitory computer program product comprising a plurality of instructions that, when executed by a processor of an electronic device, cause a process to be carried out, the process comprising:
   in response to user input provided to a mobile computing device displaying an active applications screen, invoke a manage active apps mode in the device, the user input including shaking the device while a power button of the device is depressed, wherein the manage active apps mode, when invoked, performs one of a close, stop, force stop, quit, and delete function on one or more active applications in response to the shaking input exceeding a minimum threshold, wherein review for the shaking input that exceeds the minimum threshold continues while the power button is depressed and wherein review for other user input occurs in response to release of the power button,
   wherein the shake input includes a direction that dictates the function performed such that shaking the device in an up-and-down direction relative to the active applications screen causes a first function and shaking the device in a side-to-side manner relative to the active applications screen causes a second function different than the first function, and wherein the first and second functions are user-configurable;
   provide a confirmation prompt after invoking the manage active apps mode and before performing the first or second function to confirm performance of the first or second function is desired, such that if user confirmation input is received via the confirmation prompt then the first or second function is performed, and if user rejection input is received via the confirmation prompt then the first or second function is not performed and review for other user input is performed;
   perform the first or second function on the one or more active applications after confirmation input is received via the confirmation prompt; and
   provide feedback after the first or second function has been performed to indicate that the first or second function has been performed, the feedback being at least one of visual, auditory, and tactile.

5. The computer program product of claim 4 wherein the shaking input minimum threshold is user-configurable.

6. The computer program product of claim 4, the process further comprising: display an animation when the device is being shaken while the power button is depressed.

* * * * *